(12) United States Patent
Sharma et al.

(10) Patent No.: US 11,337,271 B2
(45) Date of Patent: May 17, 2022

(54) APPARATUS AND METHOD FOR PROVIDING COMMUNICATION BASED ON DEVICE-TO-DEVICE RELAY SERVICE IN MOBILE COMMUNICATION SYSTEM

(71) Applicant: NEC CORPORATION, Tokyo (JP)

(72) Inventors: Vivek Sharma, London (GB); Yassin Aden Awad, Uxbridge (GB)

(73) Assignee: NEC CORPORATION, Tokyo (JP)

( * ) Notice: Subject to any disclaimer, the term of this patent is extended or adjusted under 35 U.S.C. 154(b) by 503 days.

(21) Appl. No.: 16/081,983

(22) PCT Filed: Mar. 7, 2017

(86) PCT No.: PCT/JP2017/008977
§ 371 (c)(1),
(2) Date: Sep. 4, 2018

(87) PCT Pub. No.: WO2017/159451
PCT Pub. Date: Sep. 21, 2017

(65) Prior Publication Data
US 2020/0288535 A1    Sep. 10, 2020

(30) Foreign Application Priority Data

Mar. 16, 2016 (GB) ...................................... 1604445

(51) Int. Cl.
*H04W 88/04* (2009.01)
*H04W 76/14* (2018.01)
(Continued)

(52) U.S. Cl.
CPC ........... *H04W 88/04* (2013.01); *H04W 8/005* (2013.01); *H04W 12/037* (2021.01);
(Continued)

(58) Field of Classification Search
CPC ..... H04W 76/14; H04W 88/04; H04W 76/11; H04W 76/27
See application file for complete search history.

(56) References Cited

U.S. PATENT DOCUMENTS

| | | | |
|---|---|---|---|
| 6,792,112 B1 * | 9/2004 | Campbell | ................ H04K 1/00 380/270 |
| 8,934,400 B2 * | 1/2015 | Speight | ............. H04W 74/0833 370/315 |

(Continued)

FOREIGN PATENT DOCUMENTS

| | | |
|---|---|---|
| CN | 101754410 A | 6/2010 |
| CN | 103905389 A | 7/2014 |

(Continued)

OTHER PUBLICATIONS

Communication dated Dec. 10, 2019 from Japanese Patent Office in JP Application No. 2018-565241.

(Continued)

*Primary Examiner* — Min Jung
(74) *Attorney, Agent, or Firm* — Sughrue Mion, PLLC

(57) ABSTRACT

A communication system is disclosed in which a ProSe Relay UE allows a remote UE to connect to a base station and core network through the Relay UE. The base station broadcasts that it is capable of supporting ProSe Relay UEs. UEs that are in poor coverage areas can identify that the base station supports ProSe Relaying and can search for a relay UE with which to connect prior to trying to establish a direct connection with the base station. The Relay UE and the base station maintain context information for the relayed UE so that messages can be properly routed through the network and through the Relay UE.

18 Claims, 9 Drawing Sheets

(51) Int. Cl.
  *H04W 76/11* (2018.01)
  *H04W 76/27* (2018.01)
  *H04W 8/00* (2009.01)
  *H04W 36/00* (2009.01)
  *H04W 12/037* (2021.01)
  *H04W 92/18* (2009.01)

(52) U.S. Cl.
  CPC ........ *H04W 36/0033* (2013.01); *H04W 76/11* (2018.02); *H04W 76/14* (2018.02); *H04W 76/27* (2018.02); *H04W 92/18* (2013.01)

(56) References Cited

U.S. PATENT DOCUMENTS

| | | | |
|---|---|---|---|
| 2004/0063451 A1 | 4/2004 | Bonta et al. | |
| 2013/0016649 A1* | 1/2013 | Damnjanovic | H04W 88/04 370/315 |
| 2014/0169265 A1* | 6/2014 | Park | H04W 40/36 370/315 |
| 2014/0241236 A1 | 8/2014 | Speight et al. | |
| 2014/0349694 A1 | 11/2014 | Raghothaman et al. | |
| 2015/0119055 A1 | 4/2015 | Shin et al. | |
| 2016/0044678 A1 | 2/2016 | Kwon | |
| 2017/0093541 A1* | 3/2017 | Pan | H04W 76/14 |
| 2018/0070400 A1* | 3/2018 | Wu | H04W 8/005 |
| 2018/0123682 A1* | 5/2018 | Jung | H04B 7/2606 |
| 2018/0213588 A1* | 7/2018 | Wei | H04W 48/08 |
| 2020/0187130 A1* | 6/2020 | Zhang | H04B 17/336 |

FOREIGN PATENT DOCUMENTS

| | | |
|---|---|---|
| CN | 104954976 A | 9/2015 |
| JP | 2013201581 A | 10/2013 |
| JP | 2017-526267 A | 9/2017 |
| WO | 2015/005900 A1 | 1/2015 |
| WO | 2015/026200 A1 | 2/2015 |
| WO | 2015/156288 A1 | 10/2015 |
| WO | 2015/199490 A1 | 12/2015 |

OTHER PUBLICATIONS

Huawei et al., "Relay UE selection for UE-to-Network relay", 3GPP TSG RAN WG1 Meeting #80bis, R1-151278, Apr. 20-24, 2015, Belgrade, Serbia, 3 pages.

Intel Corporation, "Discussion on RAN2 Aspects of D2D Communication", 3GPP TSG RAN2 Meeting #83, R2-132824, Aug. 19-23, 2013, Barcelona, Spain, 6 pages.

Search Report for corresponding GB 1604445.5, dated Sep. 16, 2016.

Written Opinion for PCT/JP2017/008977, dated Jul. 25, 2017.

International Search Report for PCT/JP2017/008977, dated Jul. 25, 2017.

Notice of Reasons for Refusal dated Sep. 17, 2019 from the Japanese Patent Office in application No. 2018-565241.

Coolpad, "Resource Allocation for IC and OOC Scenarios", 3GPP TSG-RAN WG2 #92, R2-156399, Nov. 16-20, 2015, pp. 1-4 (4 pages).

Office Action dated Jun. 9, 2020 in Japanese Application No. 2018-565241.

Office Action dated May 27, 2020 in European Application No. 17712855.0.

Chinese Office Action for CN Application No. 201780017744.6 dated May 8, 2021 with English Translation.

* cited by examiner

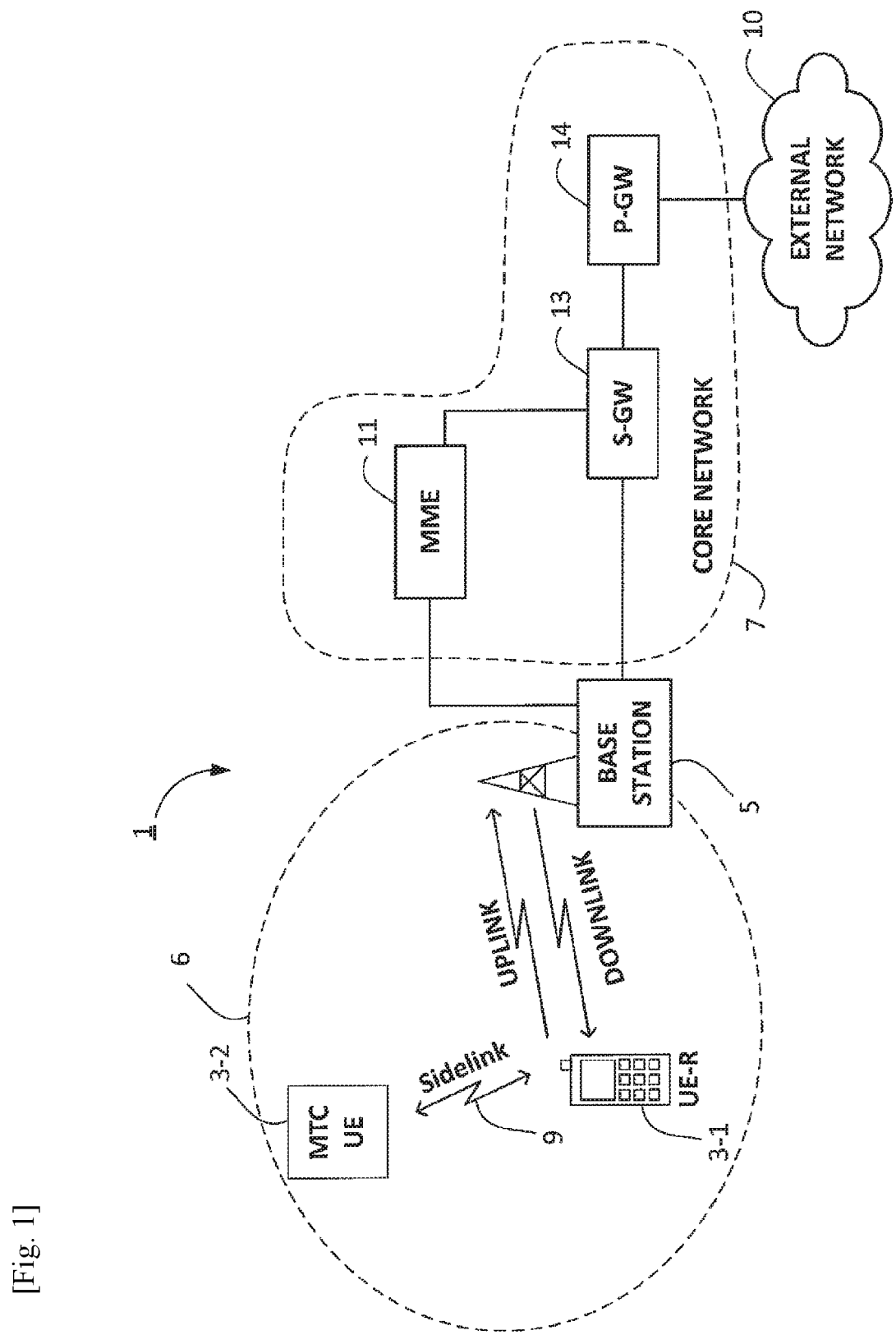
[Fig. 1]

[Fig. 2]
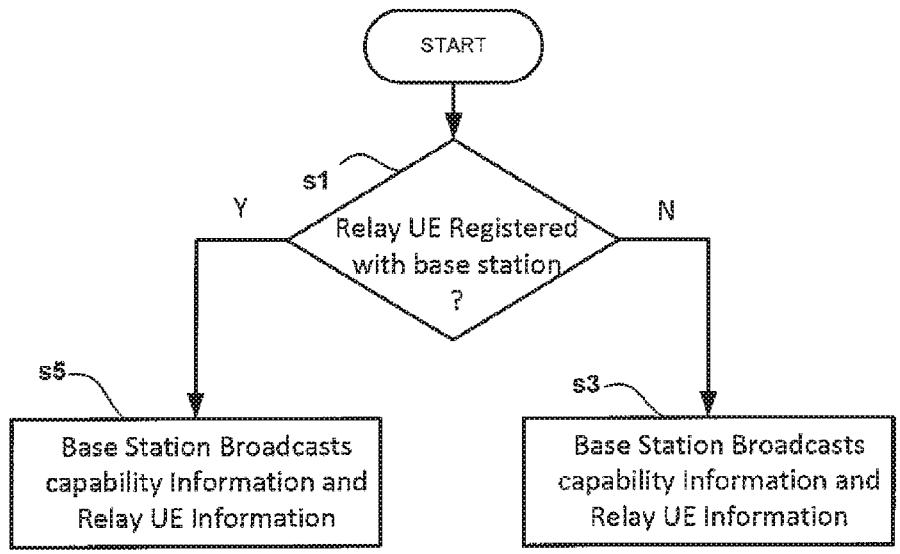
[Fig. 3]
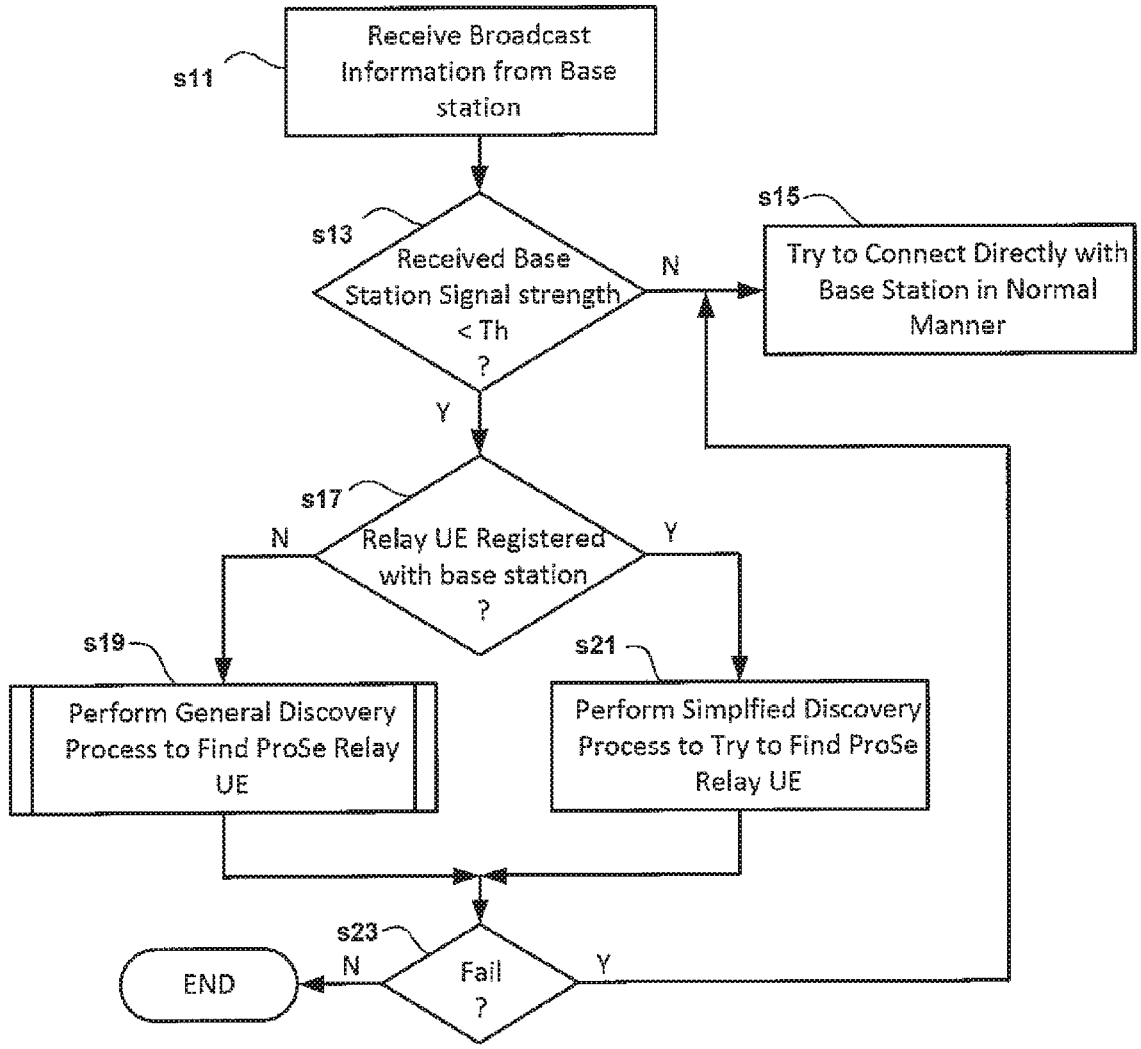

[Fig. 4]
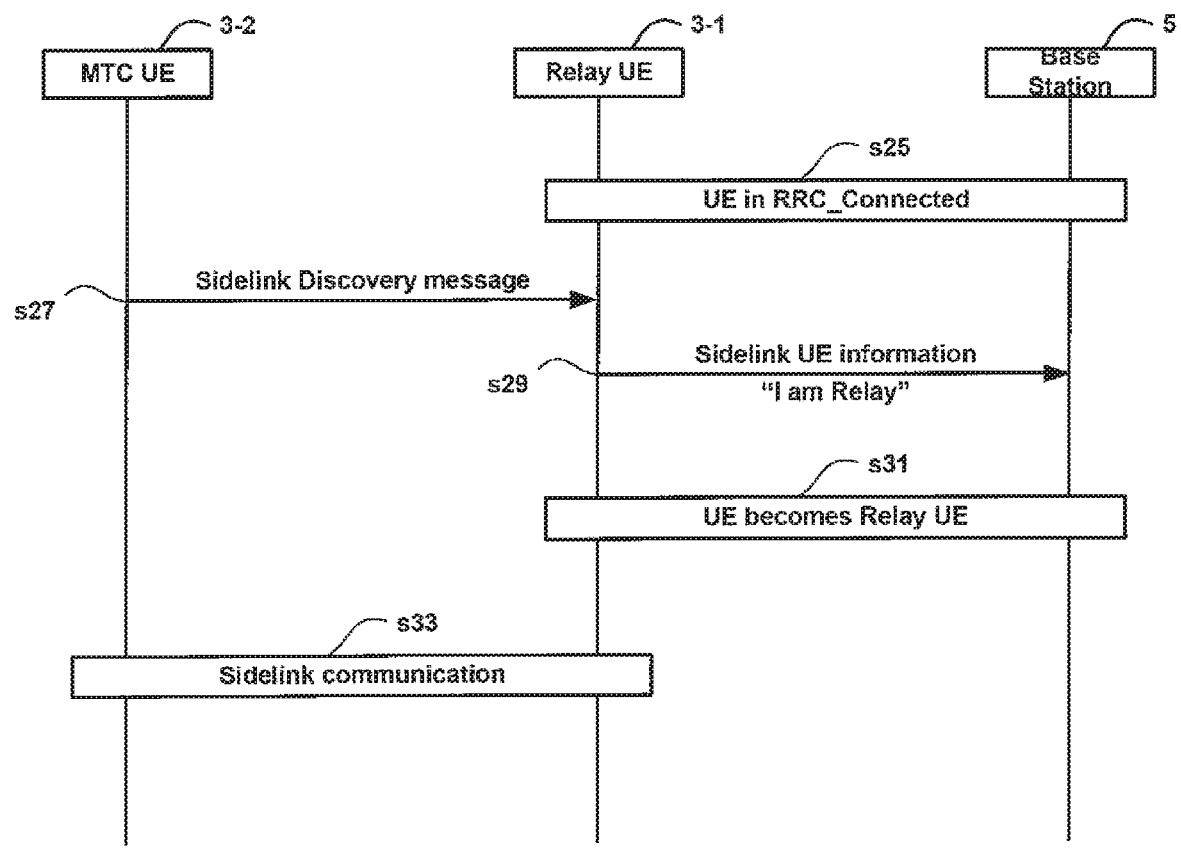

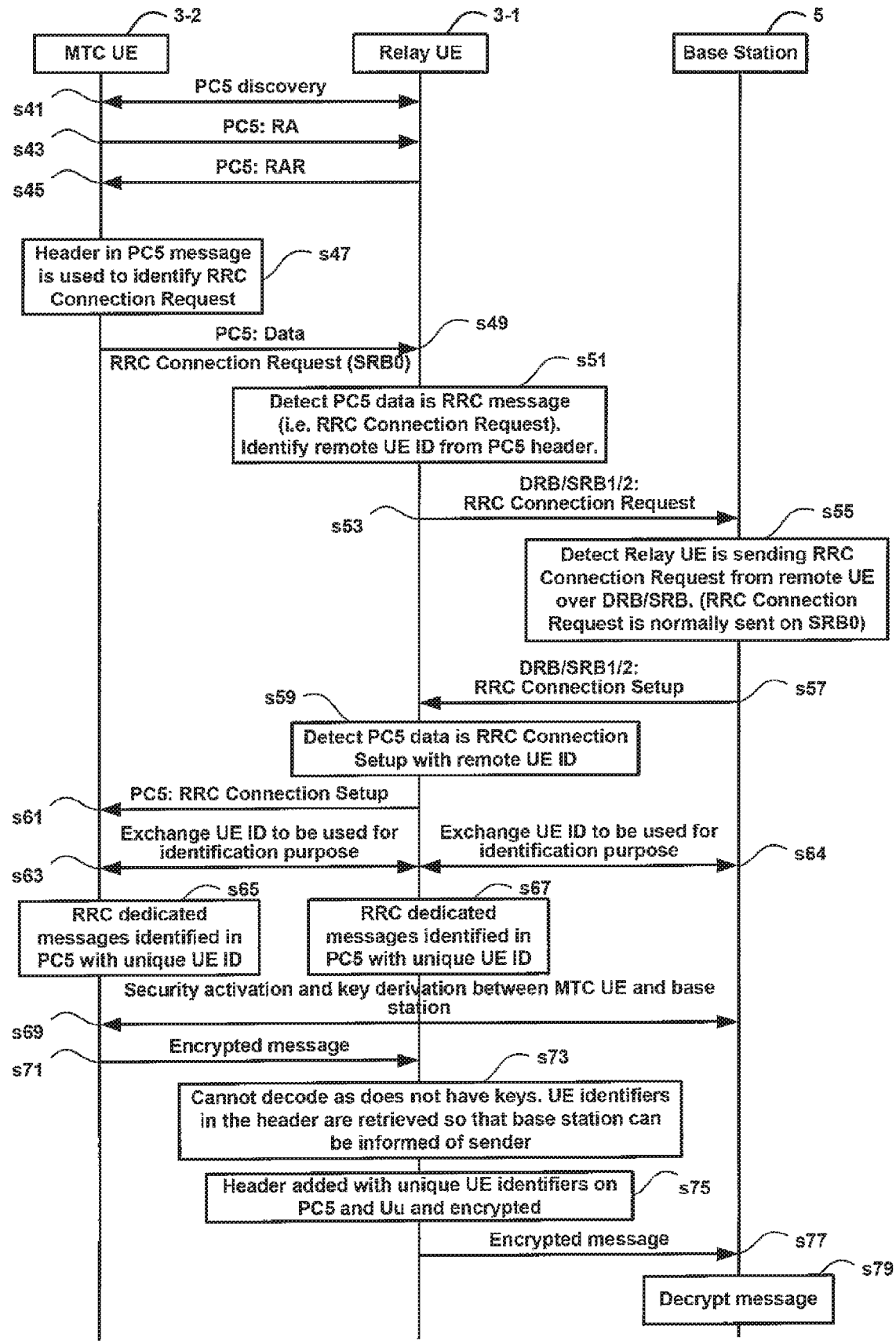
[Fig. 5]

[Fig. 6]
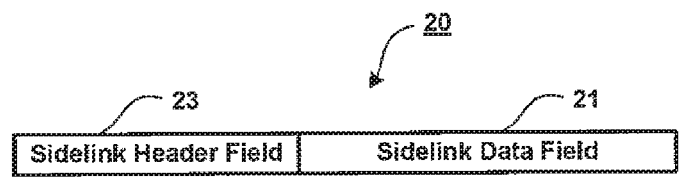

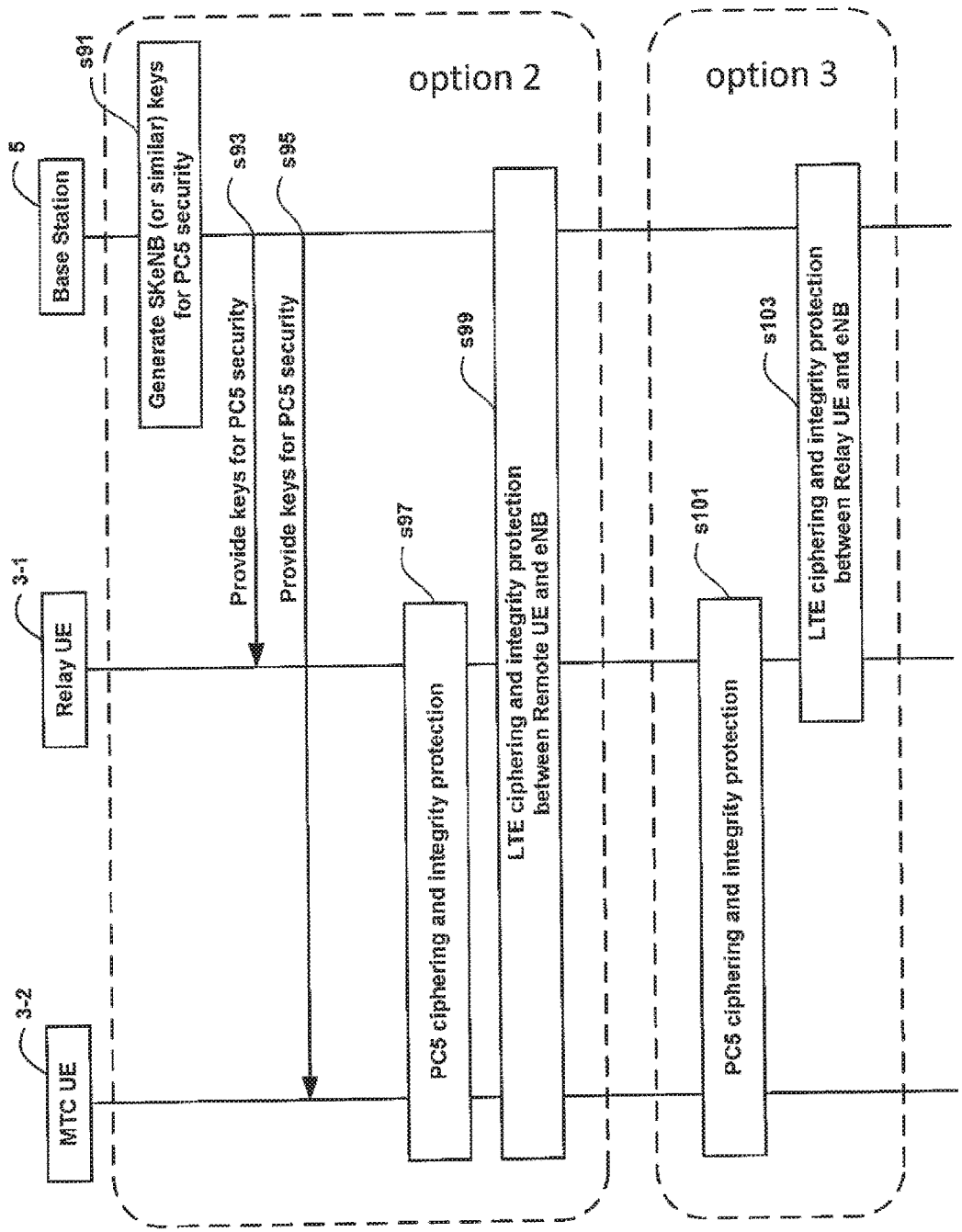
[Fig. 7]

[Fig. 8]
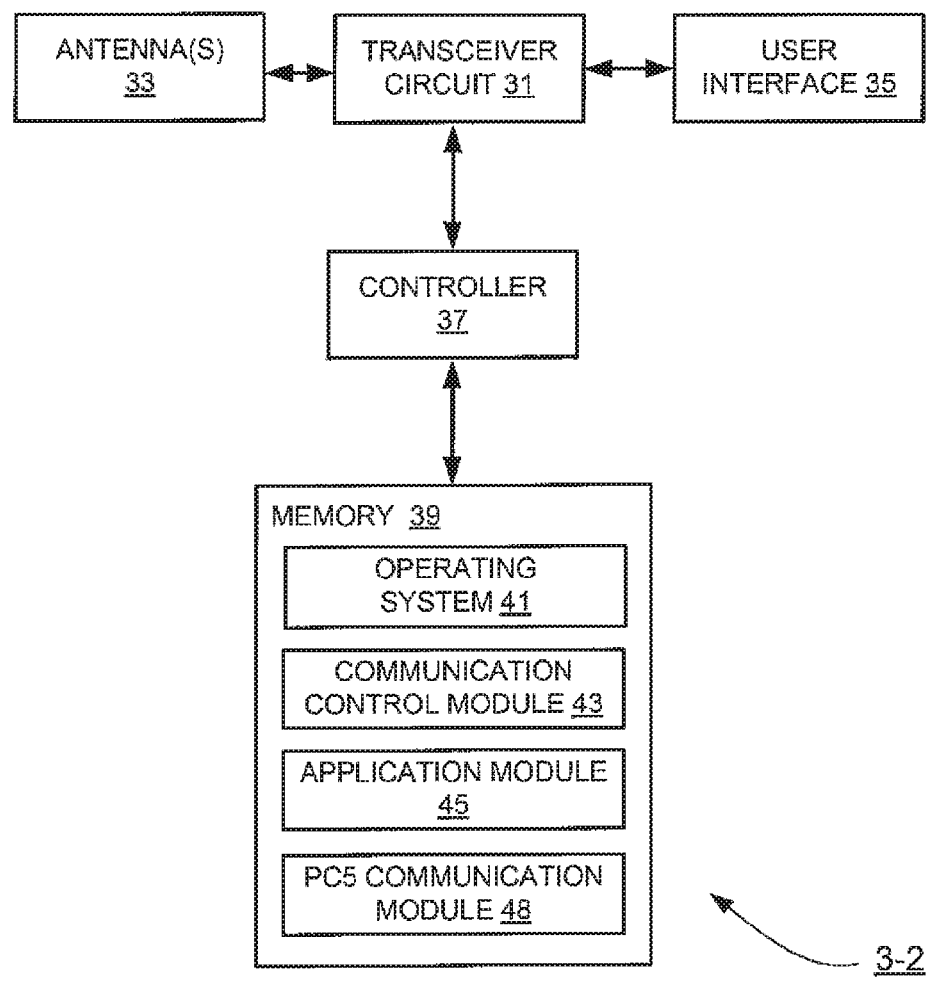

[Fig. 9]
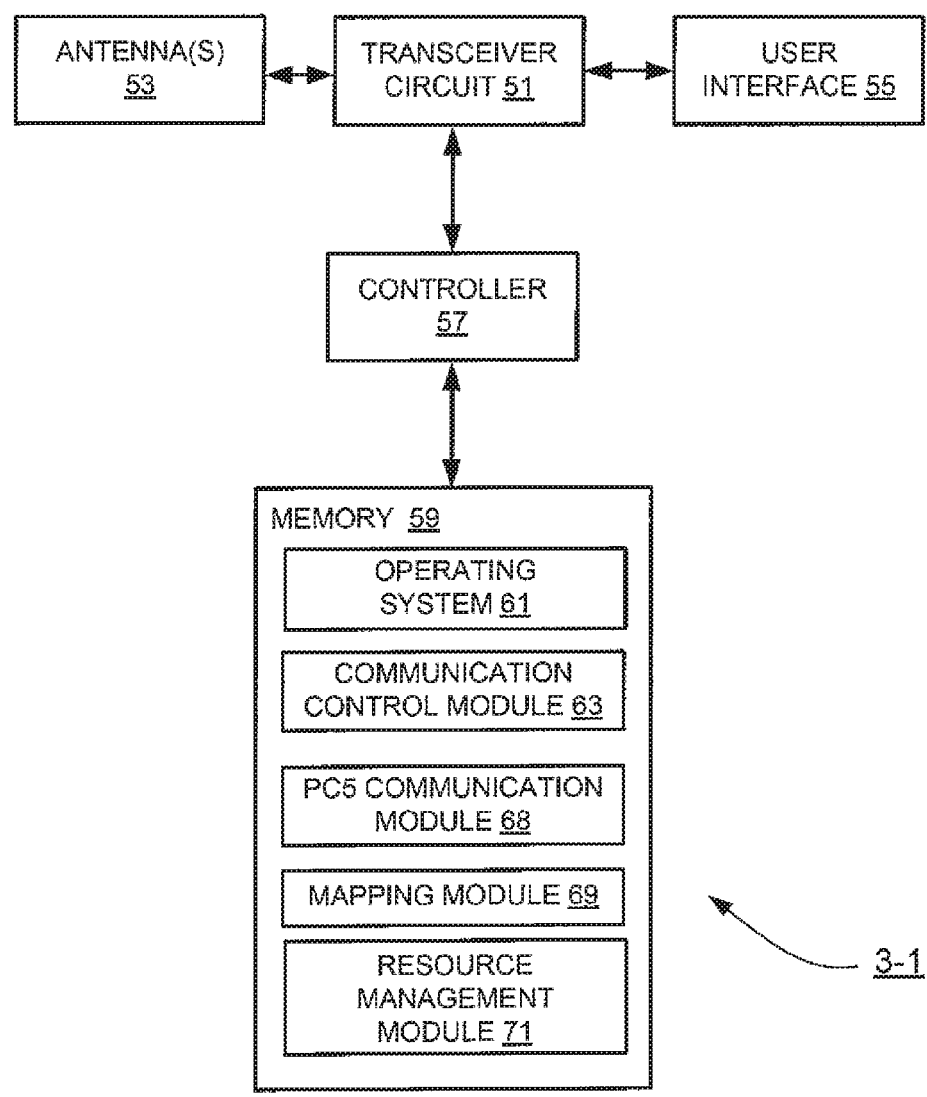

[Fig. 10]
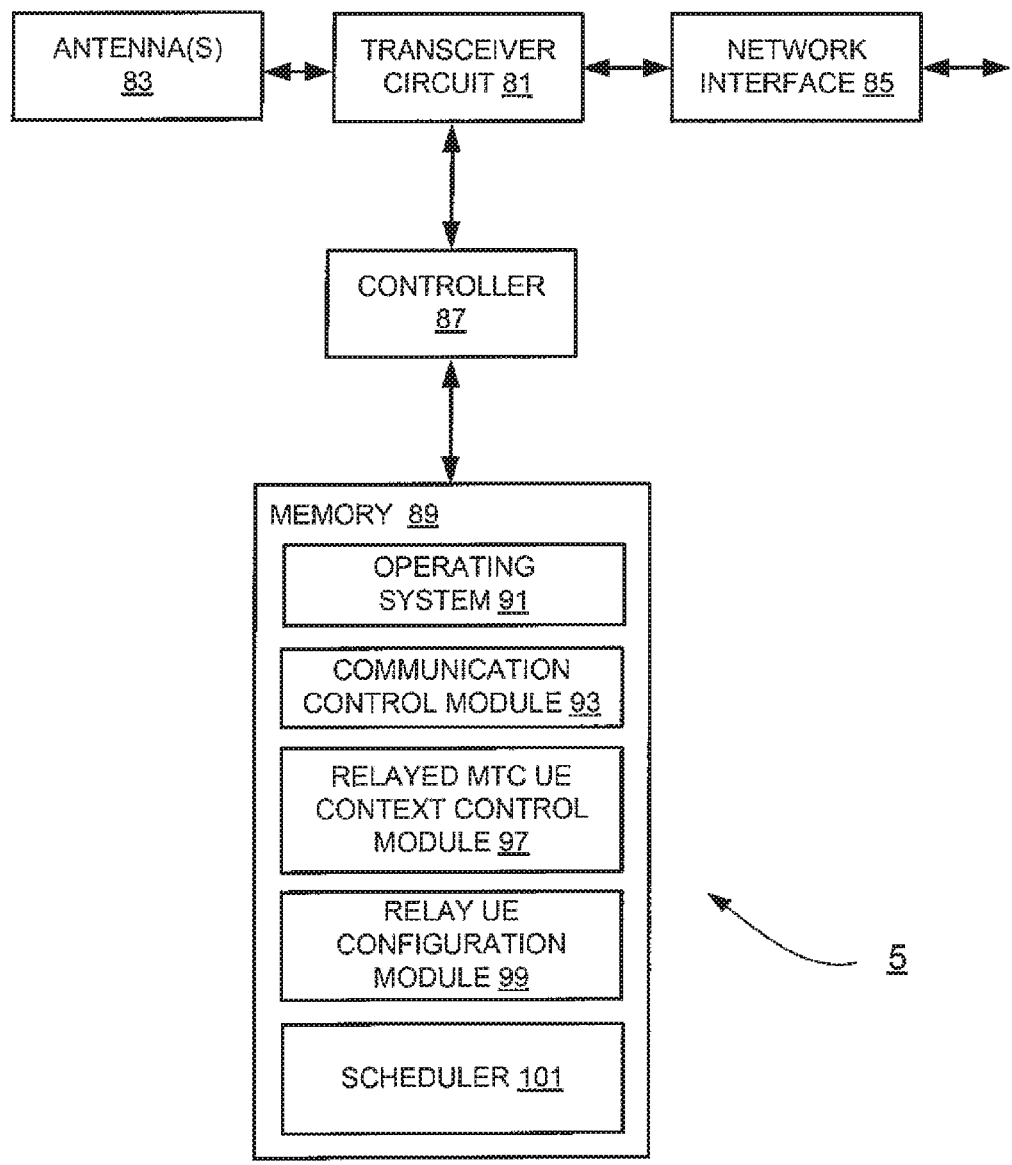

APPARATUS AND METHOD FOR PROVIDING COMMUNICATION BASED ON DEVICE-TO-DEVICE RELAY SERVICE IN MOBILE COMMUNICATION SYSTEM

CROSS REFERENCE TO RELATED APPLICATIONS

This Application is a National Stage of International Application No. PCT/JP2017/008977 filed Mar. 7, 2017, claiming priority based on United Kingdom Patent Application No. 1604445.5 filed Mar. 16, 2016, the disclosure of which is incorporated herein in its entirety by reference.

TECHNICAL FIELD

The present invention relates to a communication system and to parts and methods thereof. The invention has particular but not exclusive relevance to wireless communication systems and devices thereof operating according to the 3GPP standards or equivalents or derivatives thereof.

BACKGROUND ART

Wireless communication systems enable users of User Equipment (UE) to communicate with other such users via one of a number of base stations and via one or a number of core networks. Typically, the UEs are mobile terminals, such as mobile (cellular) telephones and the like, although the term UE may also refer to generally stationary communication devices, such as laptop computers, web browsers, Machine Type Communication (MTC) devices and the like.

In an active or connected state a UE is registered with the network and has a Radio Resource Control (RRC) connection with a base station so that the network knows to which base station (or cell thereof) the UE belongs and can transmit data to and receive data from. Each UE also establishes a default Evolved Packet System (EPS) Bearer (i.e. an end-to-end dedicated communication path) from the UE to an endpoint beyond the base station, typically a gateway (such as a packet data network gateway—'PDN-GW' or 'P-GW'-or the like), in the Enhanced Packet Core (EPC) network, or core network for short. An EPS Bearer, which is specific to the UE, defines a transmission path through the network and assigns an IP address to the UE, at which it can be reached by other communication devices, such as another UE. When data is sent to the mobile communication device via such an EPS bearer or via another dedicated bearer, this is referred to as a unicast transmission.

As part of the Long Term Evolution (LTE) of UTRAN (UMTS Terrestrial Radio Access Network) referred to as E-UTRAN, proximity-based services (ProSe) were introduced in Release 12 and enhanced in Release 13. 3GPP document TS 36.300 v13.2.0 is the latest Technical Specification that defines the operation of ProSe services, the content of which is incorporated herein by reference. As explained in this Technical Specification, these ProSe services make use of direct device-to-device (D2D) communication bearers directly between compatible UEs rather than indirect bearers provided from one UE, via a base station and the core network, to another UE (e.g. a pair of EPS bearers and/or broadcast/multicast bearers). Thus, when a ProSe enabled UE is within the transmission range of (or served by the same base station as) another ProSe enabled UE, they can communicate user data without the need to use core network resources. Such services can be achieved by establishing a special, 'D2D', bearer between the UEs in direct communication instead of using their default or other conventional EPS bearers (which might be still used for other types of communications). These direct or locally routed communications can result in better utilization of the available resources.

In order to be able to benefit from ProSe services, a ProSe enabled UE performs a so-called discovery procedure (which can be done with or without network assistance/coverage). As part of this discovery procedure, each ProSe enabled UE transmits (e.g. periodically) a beacon for announcing itself to other such UEs in its proximity, and also listens for beacon transmissions by other devices. After two (or more) UEs have mutually discovered each other (e.g. they have received the other mobile communication device's beacon), they are able to start a ProSe communication session with each other.

More recently the provision of relay functionality in the UE has been proposed using the ProSe functionality, to allow one UE (referred to as a Relay UE) to relay the user data for another UE to and from the network, even if the other UE is not located within the network's coverage. In this case, the relayed UE can communicate with the network via the Relay UE thus accessing the same services as if the relayed UE were served by a base station of the network.

It should be noted that this kind of ProSe relaying is quite different from a conventional relaying system in which the relay node (which may be a UE) acts as a base station as far as the relayed UE is concerned—and operates its own relay cell.

SUMMARY OF INVENTION

Technical Problem

It has been recognised that this ProSe relaying may be advantageous in providing coverage for Machine Type Communication (MTC) UEs that may be located in areas where the signal strength from the base station is relatively weak (such as inside buildings and in basements and the like). Many of these MTC devices are intended to be low cost, low power and low bandwidth devices and a key enabler for the Internet of Things (IoT). If such an MTC device is located in an area where there is poor base station signal strength, then the MTC device will consume a lot of power trying to establish and maintain a connection directly with the remote base station. However, if the MTC device is ProSe enabled and another ProSe enabled UE is located nearby, then the MTC device can considerably reduce its power consumption by communicating via the ProSe enabled UE rather than directly with the base station.

However, the inventors have recognised that further enhancements can be made to the proposals for ProSe and that some of the proposals that have already been made may cause problems in some use scenarios.

Solution to Problem

According to one example aspect, the present invention provides a base station configured to operate with a relay user equipment that can provide relay services to another user equipment, the base station comprising: a transceiver circuit arranged to communicate over communication links using a plurality of communication resources; and a controller arranged to: configure the relay user equipment for relay communication with the other user equipment over a side-link; schedule communication resources for use in providing the relay user equipment downlink communications from the base station to the relay user equipment and uplink communications from the relay user equipment to the base station, and schedule communication resources to be used by the relay user equipment for communicating with the other user equipment over said side-link; receive a message from the relay user equipment, the message containing a communications control message generated by the other user equipment; and maintain communication context information for the other user equipment that communicates with the base station via the relay user equipment, the communication context information allowing the base station to be able to route communications from the other user equipment through a core network and for allowing communications received over the core network for the other user equipment to be transmitted to the other user equipment via the relay user equipment over the side-link.

The communication context information may comprise identification information for the other user equipment, such as an identifier used by the relay user equipment to address the other user equipment over the side-link; or a temporary mobile subscriber identity that identifies the other user equipment to the base station and to nodes in the core network.

In some example embodiments, the controller is arranged to determine that the message received from the relay user equipment contains a message from the other user equipment either from the communication resources that are used to carry the message transmitted by the relay user equipment or from information included in the message.

The controller may also be arranged to perform a first decryption of the message received from the relay user equipment using keys associated with the relay user equipment to generate a decrypted message and to perform a second decryption on contents of the decrypted message using keys associated with the other user equipment.

The present invention also provides a relay user equipment configured to provide relay communication services for another user equipment, the relay user equipment comprising: a transceiver circuit arranged to communicate over communication links using a plurality of communication resources; and a controller arranged to: receive an allocation of communication resources from a base station to allow for reception of downlink communications from the base station and transmission of uplink communications to the base station, and to allow for communications with the other user equipment over a side-link; receive a message from the other user equipment over the side-link, the message containing a communications control message generated by the other user equipment; generate a new message containing the communications control message generated by the other user equipment for transmission to the base station using communication resources that have been allocated to the relay user equipment for said uplink communications; wherein the new message includes communication context information for the other user equipment, the communication context information allowing the base station to be able to route communications from the other user equipment through a core network; receive downlink communications from the base station that include messages for the other user equipment; and transmit the messages for the other user equipment to the other user equipment over the side-link.

The controller may be arranged either to use communication resources that the base station associates with the other user equipment to transmit the message or to include information identifying the other user equipment to the base station in the transmitted message.

The invention also provides a user equipment configured to communicate with a remote base station via a relay user equipment, the user equipment comprising: a transceiver circuit arranged to communicate with said relay user equipment over a communication side-link using a plurality of communication resources; and a controller arranged to: generate a communications control message for the remote base station; transmit the generated communications control message over said communication side-link to said relay user equipment; and receive communications from the relay user equipment over the communication side-link that contain messages from the base station.

The controller may be configured, prior to transmitting the generated communications control message to the relay user equipment, to encrypt the communications control message using encryption keys specific to the base station and the user equipment. The controller may provide one or both of: information to the relay user equipment identifying the user equipment to the relay user equipment and information identifying the communications control message that is to be transmitted to the base station by the relay user equipment. Typically the communications control message comprises a Radio Resource Control, RRC, message, such as an RRC Connection Request message.

The invention also provides a user equipment configured to communicate with a remote base station via a relay user equipment, the user equipment comprising: a transceiver circuit arranged to communicate using a plurality of communication resources; and a controller arranged: to receive broadcast information from the remote base station, the broadcast information including information indicating that the base station can operate with the relay user equipment; in response to receiving said broadcast information, to cause said user equipment to perform a relay user equipment discovery process to establish a connection with said relay user equipment before performing a random access procedure that is used to connect the user equipment directly with the remote base station.

The controller may determine a strength of a signal received from the remote base station and then cause the user equipment to perform the relay user equipment discovery process if the determined strength is below a threshold.

The controller may cause the user equipment to perform a first discovery process to discover said relay user equipment or a second discovery process to discover said relay user equipment depending on content of the broadcast information broadcast by said remote base station.

The invention also provides a base station configured to operate with a relay user equipment that can provide relay services to another user equipment, the base station comprising: a transceiver circuit arranged to communicate over communication links using a plurality of communication resources; and a controller arranged to: broadcast information over a broadcast channel informing user equipment that the base station is capable of operating with the relay user equipment that can provide the relay services to the other user equipment; configure the relay user equipment for relay communication with the other user equipment over a side-link; and schedule communication resources for use in providing the relay user equipment downlink communications from the base station to the relay user equipment and uplink communications from the relay user equipment to the base station, and schedule communication resources to be used by the relay user equipment for communicating with the other user equipment over said side-link.

The controller may broadcast capability information in a System Information Block or in a paging request.

If a relay user equipment has registered with the base station, then the controller may broadcast an indication that there is an existing relay user equipment registered with the base station and in some cases identification information for the registered existing relay user equipment.

The present invention also provides a method performed by a base station that operates with a relay user equipment that can provide relay services to another user equipment, the method comprising: configuring the relay user equipment for relay communication with the other user equipment over a side-link; scheduling communication resources for use in providing the relay user equipment downlink communications from the base station to the relay user equipment and uplink communications from the relay user equipment to the base station, and for scheduling communication resources to be used by the relay user equipment for communicating with the other user equipment over said side-link; receiving a message from the relay user equipment, the message containing a communications control message generated by the other user equipment; and maintaining communication context information for the other user equipment that communicates with the base station via the relay user equipment, the communication context information allowing the base station to be able to route communications from the other user equipment through a core network and for allowing communications received over the core network for the other user equipment to be transmitted to the other user equipment via the relay user equipment over the side-link.

The invention also provides a method performed by a relay user equipment that provides relay communication services for another user equipment, the method comprising: receiving an allocation of communication resources from a base station to allow for reception of downlink communications from the base station and transmission of uplink communications to the base station, and to allow for communications with the other user equipment over a side-link; receiving a message from the other user equipment over the side-link, the message containing a communications control message generated by the other user equipment;

generating a new message containing the communications control message generated by the other user equipment for transmission to the base station using communication resources that have been allocated to the relay user equipment for said uplink communications; wherein the new message includes communication context information for the other user equipment, the communication context information allowing the base station to be able to route communications from the other user equipment through a core network; receiving downlink communications from the base station that include messages for the other user equipment; and transmitting the messages for the other user equipment to the other user equipment over the side-link.

The invention also provides a method performed in a user equipment that communicates with a remote base station via a relay user equipment, the method comprising: generating a communications control message for the remote base station; transmitting the generated communications control message over a side-link to said relay user equipment; and receiving communications from the relay user equipment over the side-link that contain messages from the remote base station.

The invention also provides a method performed in a user equipment that communicates with a remote base station via a relay user equipment, the method comprising: receiving broadcast information from the remote base station, the broadcast information including information indicating that the remote base station can operate with the relay user equipment; in response to receiving said broadcast information, causing said user equipment to perform a relay user equipment discovery process to establish a connection with said relay user equipment before performing a random access procedure that is used to connect the user equipment directly with the remote base station.

The invention also provides a method performed in a base station that operates with a relay user equipment that can provide relay services to another user equipment, the method comprising: broadcasting information over a broadcast channel informing user equipment that the base station is capable of operating with the relay user equipment that can provide the relay services to the other user equipment; configuring the relay user equipment for relay communication with the other user equipment over a side-link; and scheduling communication resources for use in providing the relay user equipment downlink communications from the base station to the relay user equipment and uplink communications from the relay user equipment to the base station, and for scheduling communication resources to be used by the relay user equipment for communicating with the other user equipment over said side-link.

Aspects of the invention extend to computer program products such as computer readable storage media having instructions stored thereon which are operable to program a programmable processor to carry out a method as described in the aspects and possibilities set out above or recited in the claims and/or to program a suitably adapted communications device to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Example embodiments of the invention will now be described, by way of example, with reference to the accompanying drawings, in which:

BRIEF DESCRIPTION OF DRAWINGS

FIG. 1 illustrates schematically a cellular communication system to which example embodiments of the invention may be applied;

FIG. 2 is a flowchart illustrating steps performed within the base station shown in FIG. 1 to determine information to broadcast within a cell operated by the base station;

FIG. 3 is a flowchart illustrating steps performed by an MTC UE forming part of the system shown in FIG. 1 in response to the receipt of the information broadcast by the base station;

FIG. 4 is a flowchart illustrating a discovery process performed by the MTC UE and the Relay UE shown in FIG. 1 used to discover each other and to establish a Sidelink link between each other;

FIG. 5 is a timing diagram illustrating the way in which messages are routed from the MTC UE to the base station via the Relay UE and illustrating a first option for securing the communications transmitted over the Sidelink link;

FIG. 6 illustrates a PC5 message transmitted over the Sidelink link established between the MTC UE and the Relay UE shown in FIG. 1;

FIG. 7 illustrates two alternative options for securing messages transmitted over the Sidelink link;

FIG. 8 is a functional block diagram illustrating some of the functionality of an MTC UE forming part of the system shown in FIG. 1;

FIG. 9 is a functional block diagram illustrating some of the functionality of the Relay UE forming part of the system shown in FIG. 1; and FIG. 10 is a functional block diagram illustrating some of the functionality of the base station forming part of the system shown in FIG. 1.

DESCRIPTION OF EMBODIMENTS

Overview

FIG. 1 schematically illustrates a communication network 1 in which user equipment (UE) 3 (in this example a mobile communication device 3-1 and an MTC UE device 3-2) can communicate with each other and other users via an E-UTRAN base station 5 and a core network 7. As those skilled in the art will appreciate, two UEs 3 and one base station 5 are shown in FIG. 1 for illustration purposes, additional user equipment and/or base stations may be present in a deployed system.

The base station 5 is coupled to the core network 7 and the core network 7 is coupled to other networks 10 (e.g. the Internet) via one or more gateways. The interface between the base station 5 and elements of the core network 7 might utilise, for example, a high speed, high bandwidth communication link, such as an optical fiber link and the like. The core network 7 includes, amongst other things, a Mobility Management Entity (MME) 11, a Serving Gateway (S-GW) 13, and a Packet Data Network (PDN) Gateway (P-GW) 14.

The MME 11 manages general mobility aspects of the mobile communication devices 3-1 and ensures that connectivity is maintained with the mobile UEs 3-1 as they move within the geographical area covered by the communication system (and/or as they are handed over between base stations of the communication system).

The S-GW 13 connects the base station 5 (and hence the UEs 3) to the core network 7 when a unicast bearer (e.g. an EPS bearer) is used for communicating user data. In this case, the unicast bearer normally terminates at the P-GW 14, although an external bearer may also be provided between the P-GW 14 and a communication end-point outside the core network 7 (e.g. in the internet). It will be appreciated that, whilst shown as separate entities, the functionalities of the S-GW 13 and the P-GW 14 could be implemented in a single gateway element.

The UEs 3 shown in FIG. 1 are each equipped with ProSe functionality, which allows them to establish direct communication bearers, or D2D bearers for short, with each other (assuming they are within range of each other and they have performed an appropriate discovery/connection procedure to find each other and connect to each other) to create a Sidelink link 9. The Sidelink link 9 is a wireless link and under the LTE standards is defined as the PC5 interface. For completeness, FIG. 1 also shows the uplink between the Relay UE 3-1 and the base station 5 over which the Relay UE 3-1 transmits data to the base station 5; and the downlink between the Relay UE 3-1 and the base station 5 over which the Relay UE 3-1 receives data from the base station 5. The uplink and downlink are also wireless links and form the Uu interface in LTE. As will be understood by those skilled in the art, the base station 5 allocates resources (time and/or frequency resources) to the Relay UE 3-1 that are used to carry the uplink data and the downlink data.

In this example embodiment, the Relay UE 3-1 is also provided with relaying functionality to allow data to be relayed between other UEs and the network 7 (via the base station 5). The Relay UE 3-1 can only perform ProSe relaying if the serving base station 5 supports ProSe relaying. If the base station 5 does support ProSe relaying then, upon determining this, the Relay UE 3-1 can send a request to the base station 5 requesting to become a Relay UE. This allows the base station 5 to allocate resources that would normally be used for the uplink (although downlink resources might be used instead of or in addition to the uplink resources) to be used by the Relay UE 3-1 and the MTC UE 3-2 for the Sidelink link 9. The base station 5 will also make sure that the Relay UE 3-1 is not scheduled to transmit data on the uplink at the same time as resources have been allocated for the communications over the Sidelink link 9.

In this example the MTC UE 3-2 is located within the cell (denoted 6 in FIG. 1) of the base station 5 but the received signal strength is relatively weak and so the MTC device 3-2 connects to the core network 7 via the Relay UE 3-1 (using the Sidelink link 9) and the base station 5.

As will be explained in more detail below, in this example embodiment, the base station 5 broadcasts its capability to support ProSe relaying UEs 3-1 so that the UEs within its cell 6 know that they can operate with ProSe relaying UEs 3-1. In this example embodiment, when the MTC UE 3-2 wants to connect to the base station 5, and in response to the MTC UE 3-2 determining that the base station 5 has the capability to support ProSe relaying UEs 3-1, the MTC UE 3-2 initially performs the ProSe discovery procedure—in order to try to find a relay UE (such as Relay UE 3-1); rather than initiating the normal "Random Access" procedure that is used to initiate a direct connection with the base station 5. If this discovery process does not identify a Relay UE 3-1, then the MTC UE 3-2 initiates the Random Access procedure to try to establish a direct connection with the base station 5. If the discovery process does identify the Relay UE 3-1, then the MTC UE 3-2 transmits RRC signalling messages to the base station 5 via the Relay UE 3-1 so that the base station 5 is able to establish an EPS bearer through the core network 7 over which data for the MTC UE 3-2 can be delivered to the desired destination—which may be another UE or any application server on the external network 10.

Base Station Broadcast

FIG. 2 is a flow chart illustrating the operation of the base station 5 in determining what ProSe related information it should broadcast within its cell 6 to inform UEs within its cell 6 of its capabilities. As shown in FIG. 2, in step s1, the base station 5 checks if a relay UE (such as UE 3-1) has already registered with the base station 5 to perform ProSe relaying. If no UE has registered as a ProSe relaying UE then, in step s3, the base station 5 broadcasts information indicating that it supports ProSe relaying. However, if one or more UEs 3 have registered for ProSe relaying UE, then in step s5, the base station 5 also broadcasts information indicating that there is an operational Relay UE currently operating in the cell 6. In some example embodiments, the base station 5 may also broadcast information identifying the (or each) registered Relay UE 3-1. In some example embodiments, the base station 5 may not perform the check in step s1—instead the base station 5 may simply broadcast its capability information. In either case, the base station 5 may broadcast the relevant information within the System Information Block (SIB) or within a paging message that the base station 5 broadcasts on a broadcast channel.

MTC UE

FIG. 3 is a flow chart illustrating the operation of the MTC UE 3-2. When the MTC UE 3-2 receives the broadcast information it checks or confirms, in step s11, that the base station 5 is capable of operating with ProSe Relaying UEs and if so then the processing proceeds to step s13. As shown, in step s13, the MTC UE 3-2 checks if the strength of the signal received from the base station 5 is below a threshold value (Th). If it is not then, in step s15, the MTC UE 3-2 tries to establish a connection directly with the base station 5 in the normal way (using the Random Access procedure). However, if the received signal level is below the threshold, then the MTC UE 3-2 checks, in step s17 if the ProSe information received from the base station 5 indicates if there is an operational ProSe Relaying UEs (such as Relay UE 3-1) already registered with the base station 5. If there is not, then in step s19, the MTC UE 3-2 will perform a general discovery process a few times (e.g. 3 or 4 times) to try to identify any UEs in its vicinity that are capable of performing ProSe relaying. FIG. 4 illustrates this general discovery process. As shown in step s27, the MTC UE 3-2 transmits a Sidelink Discovery Message that in this case is received by the Relay UE 3-1 that is already in an RRC connected state with the base station 5 following step s25. In response to receiving this Discovery Message, the Relay UE 3-1 transmits, in step s29, a Sidelink UE information message to the base station 5 that informs the base station 5 that the Relay UE 3-1 is going to function as a ProSe relaying UE. In step s31, the base station 5 and the Relay UE 3-1 will exchange information and settings to establish the resources to be used etc. for the Sidelink link 9. Then, in step s33, the Relay UE 3-1 and the MTC UE 3-2 establish the parameters required for communication over the Sidelink link 9.

Returning to FIG. 3, if the MTC UE 3-2 determines in step s17 that there is an existing operational Relay UE 3-1 operating in the base station's cell 6, then, in step s21, the MTC UE 3-2 performs a simplified discovery process a few times to try to establish a Sidelink link 9 with the operational Relay UE 3-1. The discovery process is simplified as there is no need for the discovered Relay UE 3-1 to register itself with the base station 5 first before completing the Sidelink link 9 establishment with the MTC UE 3-2 in step s33—as this registration has already been completed. If the base station 5 broadcasts identification information of the registered Relay UE 3-1 then the MTC UE 3-2 can use this identification information to search for that specific Relay UE 3-1 in step s27.

If the MTC UE 3-2 determines, in step s23, that the discovery process of step s19 or s21 has failed, then processing returns to step s15 where the MTC UE 3-2 tries to establish a direct connection with the base station 5 using the normal Random Access procedure; otherwise, if the discovery process of step s19 or s21 was successful, then the processing ends. As will be discussed in more detail below, one of the reasons that it is better for the MTC UE 3-2 to connect with the Relay UE 3-1 is that if it does connect with the base station 5 in a "deep coverage" mode (where the received signal level is very low), the base station 5 and the MTC UE 3-2 are programmed to use repetition of transmitted signals to provide a decoding gain to increase the chances of successful communication. However, such repetition of transmitted messages can significantly impact on the system's capacity and the MTC UE's battery life.

More specifically, in LTE there are four coverage levels defined for MTC UEs, where each one is defined by the amount of coverage enhancement to be applied. For example, level 0 is up to 6 dB of enhancement, level 1 is up to 9 dB of enhancement, level 2 up to 12 dB of enhancement and level 3 up to 16 dB of enhancement. (Of course, these dB values for the enhancements in each level are given as an example only and may be changed.) In order to move from one level to another, for example from level 0 to level 1, the number of repetitions has to be increased for example, from 16 to 32 etc. The LTE standards also define coverage enhancement Modes A and B, where mode A covers levels 0 and 1, and mode B covers levels 2 and 3. This means that some UEs are only capable of mode A enhancements, and some others both mode A and mode B enhancements. The MTC UE 3-2 decides what coverage level it shall set for itself based on the strength of the base station signal that it receives, from which it can determine the enhancement needed to achieve reliable communication with the base station.

With the above process, if a low powered MTC UE 3-2 is in a low signal area (such as in a building or in a basement or the like) then it can initially try to connect to the base station 5 via a closer ProSe Relay UE 3-1—without having to go through the normal Random Access connection procedure. This can significantly reduce the power requirements of the MTC UE 3-2—as the Random Access procedure for MTC UEs in deep coverage specifies that the MTC UE 3-2 should repeatedly try connecting to the base station 5 at maximum transmit power until a specified number of attempts (the number of attempts depending on the coverage level) have failed. If the MTC UE 3-2 is located in a difficult position (such as in the basement of a building) then the MTC UE 3-2 could use up a considerable amount of its stored battery power trying to establish a direct RRC connection with the network 7 each time it wakes up to send data.

The inventors propose that the threshold used in step s13 is set at a level so that MTC UEs that are in coverage mode B (i.e. coverage levels 3 and 4) will proceed from step s13 to step s17 and will thus try to establish a connection with the Relay UE 3-1; whereas MTC UEs that are in coverage level 1 or coverage level 2 proceed directly to step s15—where they try to establish a direct connection with the base station 5.

As an alternative, the MTC UE 3-2 may be arranged to calculate a received signal strength for the base station signal and for the Relay UE signal and then determine which one it should try to connect to first, based on the results of comparing the two received signal strengths with respective threshold values (the threshold for the base station may be set higher than the threshold for the Relay UE—to encourage the MTC UE 3-2 to connect with the Relay UE first).

Random Access in Presence of Relay UE

Of course, there may be some legacy MTC UEs that are not programmed in this preferred way and so if they determine that they are in a higher coverage level than they actually are, then those MTC UEs will still try to connect directly with the base station 5 using the normal Random Access procedure—even though there may be an operational Relay UE 3-1 located nearby. When such an MTC UE 3-2 starts the Random Access procedure, it will use a transmission power level determined based on its erroneously determined coverage level, and so the MTC UE 3-2 will transmit at a power level that may be well below that which the base station 5 is able to detect and many iterations of the Random Access procedure may be required before the MTC UE 3-2 is transmitting at a power level that can be detected by the base station 5. This is very wasteful of power within the MTC UE 3-2.

In order to mitigate this problem, the inventors propose that the Relay UE 3-1 assists the MTC UE 3-2 in performing the Random Access procedure. This can be done in a number of ways, including:

1) The Relay UE 3-1 repeats the MTC UE's Random Access signalling. To work correctly, the base station 5 will need to know that the Random Access signalling was repeated by the Relay UE 3-1. This may be achieved by the Relay UE 3-1 adding a new identifier in the Random Access preamble to identify that the Relay UE 3-1 repeated the Random access preamble; or by the Relay UE 3-1 retransmitting the Random Access Signalling on a set of resources that has been reserved in advance by the base station 5 for the retransmission of Random Access signalling from that Relay UE 3-1.
2) The Relay UE 3-1 sending the Random Access preamble to the base station 5 via control plane signalling or user plane signalling (using a suitably formatted new MAC PDU) and transmitted using resources that the base station 5 has allocated to the Relay UE 3-1 for uplink communications.
3) A further way that the Relay UE 3-1 can help with the Random Access procedure of the MTC UE 3-2 is for the MTC UE 3-2 to establish the Sidelink link 9 connection with the Relay UE 3-1 and then to send the Random Access preamble transmitted by the MTC UE 3-2 to the Relay UE 3-1 over the Sidelink link 9, for onward transmission to the base station 5. In this case, the Relay UE 3-1 would encapsulate the received Random Access preamble in a suitably formatted message that the Relay UE 3-1 transmits to the base station 5 over its uplink. The Relay UE 3-1 would also forward the base station's Random Access Response (RAR) back to the MTC UE 3-2 over the Sidelink link 9.

With the first option the Relay UE 3-1 acts as a passive repeater and repeats the Random Access signalling in subframes where base station Random Access resources are available for transmission; whereas the second option requires the Relay UE 3-1 to receive and to generate a new message that will be transmitted to the base station 5 where it will be processed to identify that the message contains a RA preamble from the MTC UE 3-2.

Normally, the MTC UE 3-2 will transmit the Random Access Preamble the required number of times (say 100) and then the MTC UE 3-2 listens for the RAR transmitted by the base station in response. However, with the intervention of the Relay UE 3-1, the base station 5 may successfully receive the Random Access preamble message well before the MTC UE 3-2 has completed transmitting the required number of repetitions of the RA preamble. For example, if the MTC UE 3-2 is required to perform 100 repetitions of the Random Access preamble and the Relay UE 3-1 picks up the transmitted RA preamble after the $5^{th}$ transmission and then sends it to the base station 5 in the next TTI, then the base station 5 will consider the RA preamble to be successfully received at the $6^{th}$ RA preamble transmission time and so will start to transmit the RAR from that point. Therefore, if the MTC UE 3-2 is configured to start its RAR window at least once during the time that it is still transmitting the RA preamble repetitions, it is possible that the MTC UE 3-2 can successfully receive the base station's RAR and so can stop transmitting the RA preamble. For example, in the above example, if the base station transmits its RAR message and this is picked up by the Relay UE 3-1 and repeated to the MTC UE 3-2 in at $10^{th}$ TTI then the MTC UE 3-2 can stop transmitting the RA preamble message and save for example 90 transmissions.

The Random Access Response (RAR) message transmitted by the base station 5 may request that the MTC UE 3-2 synchronise with the base station 5 (as normal), although the base station 5 will need to assess the synchronisation timing so that it takes into account the time taken for the Relay UE 3-1 to decode the preamble and transmit the message to the base station 5 and the time taken by the base station 5 to process the message itself. Alternatively, the base station 5 may inform the MTC UE 3-2 within the RAR that it should stop accessing the base station 5 directly and that it should seek to establish a PC5 Sidelink link 9 with the Relay UE 3-1 and communicate that way.

MTC UE Data Communication

In the currently defined ProSe situation (as defined in TS 36.300), the ProSe enabled UEs are configured to establish a Sidelink link 9 between themselves under control of a pre-programmed ProSe server that is coupled to the core network 7; and the base station 5 has no context information about the remote UE. This ProSe server defined the security parameters for the Sidelink using the PC5 interface. The ProSe server also defined L2 addressing information to be used to address communications transmitted between the UEs over the PC5 interface. However, in the present application, different MTC UEs may wish to connect to different application servers that are connected to the core network 7. Therefore, in the present application, there is no ProSe server to define these security parameters or to define the L2 addressing to be used for the Sidelink link 9 using the PC5 interface.

Therefore, the inventors propose that the Relay UE 3-1 is configured to assign the L2 addresses that are used to address packets transmitted over the Sidelink link 9. These may be assigned from a pool of such addresses maintained by the Relay UE 3-1 or they may be provided to the Relay UE 3-1 by the base station 5 when it registers with the base station as a Relay UE 3-1. This L2 addressing information may be exchanged with the MTC UE 3-2 during the discovery process that establishes Sidelink link 9. To minimise the size of the packet headers transmitted over the Sidelink link 9, these L2 addresses are not globally unique, but they can be set in such a manner as to minimise the possibility of conflicts between Sidelink links established between other neighbouring UEs.

With regard to the security of the transmissions over the PC5 Sidelink link 9, there are a number of options to achieve this:

1) Apply no specific security on the PC5 communications, relying instead on LTE security provided between the base station 5 and the MTC UE 3-2;
2) Provide both PC5 security and LTE security between the base station 5 and MTC UE 3-2; and
3) Provide both PC5 security and LTE security between the base station 5 and the Relay UE 3-1.

Data Routing and Security

With the first security option, there is no specific (additional) security applied to the communications sent over the Sidelink link 9. Instead the system relies on the data being already encrypted by the transmitting end. So when the base station 5 transmits a message to the MTC UE 3-2 or when the MTC UE 3-2 transmits a message to the base station 5, the message is LTE encrypted by the sending party before it is transmitted over the PC5 Sidelink link 9. The Relay UE 3-1 will not be able to decrypt messages sent by the base station 5 that are intended for the MTC UE 3-2 nor will it be able to decrypt messages sent by the MTC UE 3-2 that are intended for onward transmission to the base station 5 (as these transmissions use encryption keys specific to the MTC UE 3-2). Therefore, messages sent by the MTC UE 3-2 to the Relay UE 3-1 over the PC5 Sidelink link 9 will therefore need to include information that allows the Relay UE 3-1 know what to do with the received message. Similarly, messages sent by the base station 5 to the Relay UE 3-1 over the Uu link and that are intended for the remote MTC UE 302 will also need to identify that the message is for the remote MTC UE 3-2.

For control messages (RRC messages) that are normally transmitted over a common control channel (CCCH), the message itself contains a UE identifier identifying the UE to which the message relates—therefore, the base station 5 and the MTC UE 3-2 are able to receive and process such common control messages without additional information. However, for RRC messages that are normally transmitted over a dedicated control channel (DCCH), the message itself does not include a UE identifier—as the receiving device is normally able to identify the UE to which the message relates from the dedicated resources that were used to transmit the message. In the present relaying scenario, however, the dedicated resources that are used are dedicated to the Relay UE 3-1—and not to the MTC UE 3-2. So again, some mechanism is needed to allow the receiving device know that to which UE the message relates.

A description will now be given of ways in which this data routing problem can be addressed for an example scenario of the MTC UE 3-2 establishing a Sidelink link 9 with the Relay UE 3-1 in order to establish an RRC Connection with the base station 5. Similar approaches can be taken for handling other RRC messages.

FIG. 5 is a timing diagram illustrating the way in which the PC5 Sidelink link 9 may be established and used to allow the remote MTC UE 3-2 to send an RRC Connection Request message to the base station 5 via the Relay UE 3-1; and using the above Security Option 1.

As shown, in step s41 the MTC UE 3-2 and the Relay UE 3-1 perform the above discovery process to discover each other so that the PC5 Sidelink link 9 can be established. Once the two UEs have discovered each other, the MTC UE 3-2 sends, in step s43, a Random Access message to the Relay UE 3-1 over the PC5 Sidelink link 9; and in step s45 the Relay UE 3-1 returns a Random Access Response (RAR) message. This Random Access procedure allows the MTC UE 3-2 to synchronise itself to the Relay UE 3-1 and the Relay UE 3-1 assigns the MTC UE 3-2 a temporary identifier (C-RNTI). This temporary identifier may be an identifier generated by the Relay UE 3-1 or it may be an identifier chosen from a set of such identifiers provided to the Relay UE 3-1 at the time that it registered with the base station 5 for relaying purposes.

As discussed above, the purpose of the MTC UE 3-2 establishing the PC5 Sidelink link 9 with the Relay UE 3-1 is so that the MTC UE 3-2 can send an RRC Connection Request to the base station 5. Therefore, in step s47, the MTC UE 3-2 generates a PC5 data message (20 shown in FIG. 6) that has a data field 21 and a header field 23. The MTC UE 3-2 places a normal RRC Connection Request message in the data field 21 of the PC5 message 20; and in the header field 23 the MTC UE 3-2 includes data identifying that the PC5 message contains an RRC Connection Request message for the base station 5 as well as the temporary UE identifier (C-RNTI) that identifies the MTC UE 3-2. In step s49, the MTC UE 3-2 transmits the thus generated PC5 message 20 to the Relay UE 3-1—without any encryption. In step s51, the Relay UE 3-1 receives the transmitted PC5 message 20 and determines, from the header field 23, that the data field 21 contains an RRC Connection Request message for the base station 5 and that the message has been transmitted from MTC UE 3-2. Of course, as the RRC Connection Request message is not encrypted, the Relay UE 3-1 can determine from the message itself that it is an RRC Connection Request message (rather than user plane data) and that it originates from the MTC UE 3-2. However, for other messages sent after LTE encryption has been established between the MTC UE 3-2 and the base station 5, this will not be possible.

In step s53, the relay UE 3-1 (which is already in an RRC connected state with the base station 5) sends the RRC Connection Request to the base station on behalf of the MTC UE 3-2. The relay UE 3-1 will send this message over a Data Radio Bearer or a Signalling Radio Bearer that has been established for communications between the Relay UE 3-1 and the base station 5. Communications transmitted over these Radio Bearers are encrypted using the encryption keys specific to the Relay UE 3-1 and therefore, the base station 5 would normally assume that the message is from the Relay UE 3-1. Therefore, the message transmitted in step s53 is sent in such a way that the base station 5 can determine, in step s55, that the message is actually from a remote MTC UE 3-2. This may be achieved in a number of different ways. For example, an additional Information Element may be included in the message indicating that a remote UE (and not the Relay UE 3-1) is the originator of the RRC Connection Request. Or, in a preferred embodiment, the Relay UE 3-1 may simply indicate that another UE is the originator by sending the RRC Connection Request message on a different Radio Bearer (RB) to the one that is normally used. In particular, the current requirement is for UEs to send the base station 5 an RRC Connection Request message on SRB0. Therefore, if the Relay UE 3-1 sends the RRC Connection Request on a different Radio Bearer (a Data Radio Bearer (DRB) or another Signalling Radio Bearer—SRB1 or SRB2 or another SRB that is dedicated to carrying signalling for the MTC UE 3-2), then the base station 5 can be programmed to determine from this that the RRC Connection Request does not actually come from the Relay UE 3-1 but originates from another remote UE (in this example the MTC UE 3-2).

Further, as those skilled in the art will appreciate, the RRC Connection Request message is a message transmitted over the Common Control Channel and so the message will contain an identity of the UE that sent the message—in the form of an SAE Temporary Mobile Subscriber Identity (S-TMSI). The message will also include the C-RNTI ID that the MTC UE 3-2 was assigned by the Relay UE 3-1 in step s45. However, for other control messages sent by the MTC UE 3-2 via the Relay UE 3-1, the message itself will not include an ID for the MTC UE 3-2, so for these messages (that are normally sent over a Dedicated Control Channel (DCCH)) the Relay UE 3-1 must take steps to ensure that the base station 5 is aware of the UE that is transmitting the message.

In response to detecting, in step s55, that the RRC Connection Request comes from another UE, the base station 5 will establish appropriate signalling and data bearers through the core network 7 and will store information indicating that these radio bearers are routed through the Relay UE 3-1. The base station 5 then transmits, in step s57, an RRC Connection Setup message back to the Relay UE 3-1 for onward transmission to the MTC UE 3-2. This message will again be encrypted using the encryption keys specific to the Relay UE 3-1. The base station 5 needs to send the message in such a way that the Relay UE 3-1 can determine, in step s59, that the message is not for itself but for the MTC UE 3-2. As before, this can be achieved by including a new Information Element that identifies that the message is for the MTC UE 3-2; or the base station 5 can indicate this simply by sending the RRC Connection Setup message over a data Radio Bearer or over a Signalling Radio Bearer that is not normally used to carry RRC Connection Setup requests (i.e. DRB, SRB1 or SRB2 or a new SRB dedicated to carrying messages for MTC UE 3-2, rather than over SRB0). Both the base station 5 and the Relay UE 3-1 must allocate and be aware of a unique UE-ID of the MTC UE 3-2. As discussed above, in this example embodiment, the Relay UE 3-1 assigned the MTC UE 3-2 a C-RNTI for the PC5 Sidelink link 9 and this was included in the RRC Connection Request message. So in this case, the base station 5 will normally use the same C-RNTI ID and will include this in the RRC Connection Setup message. Again, this RRC Connection Setup message is not encrypted and with an encryption specific to the MTC UE 3-2 and so the Relay UE 3-1 can determine from the message itself what the message relates to and who it is for.

In step s61, the Relay UE 3-1 generates a suitable PC5 message that contains the RRC Connection Setup message and transmits it to the MTC UE 3-2 over the PC5 Sidelink link 9.

The C-RNTI ID of the MTC UE 3-2 contained within the RRC Connection Setup message will normally be the same as the C-RNTI ID included in the RRC Connection Request message—which will be the same as the one assigned to the MTC UE 3-2 by the Relay UE in step s45. However, there may be occasions when the base station 5 needs to change this C-RNTI ID. In this case, the RRC Connection Setup message will include a new C-RNTI ID for the MTC UE 3-2. In this case, the Relay UE 3-1 will either need to maintain a mapping between the C-RNTI ID that the Relay UE 3-1 uses to identify the MTC UE 3-2 over the PC5 Sidelink link 9 and the C-RNTI ID that the base station 5 uses to identify the MTC UE 3-2; or the Relay ID will need to change the C-RNTI ID that it uses to identify the MTC UE 3-2 so that it is the same as the identifier used by the base station 5. The latter option is the simplest form a messaging point of view.

In step s63, the Relay UE 3-1 and the MTC UE 3-2 confirm the UE ID(s) that will be used over the PC5 Sidelink link 9 to identify the MTC UE 3-2; and in step s64, the Relay UE 3-1 and the base station 5 confirm with each other how messages for the MTC UE 3-2 will be addressed—whether that is by means of adding an identifier in to a header of the message or by sending the message over a new Radio Bearer that is dedicated to carrying messages for the MTC UE 3-2 etc. This allows the MTC UE 3-2 and the Relay UE 3-1 to be able to use the correct identifiers to correctly identify messages that are to be sent over the PC5 Sidelink link 9 and over the Uu link with the base station 5 in steps s65 and s67.

In step s69, the MTC UE 3-2 and the base station 5 derive the encryption keys that will be used to secure communications between themselves in accordance with the existing LTE security procedure. Thus after this point in time, when the MTC UE 3-2 generates a message for the base station 5, it will encrypt the message and include the encrypted message in the data field 21 of the PC5 message 20 that it transmits, in step s71, to the Relay UE 3-1. In step s73, the relay UE 3-1 will not be able to decrypt the message in the data field 21 as it does not have access to the MTC UE's encryption keys. Hence the Relay UE 3-1 is no longer able to open the RRC message that the MTC UE 3-2 has sent, to find out what the message relates to and who it is from. Therefore, in step s73, the Relay UE 3-1 retrieves the UE ID for the MTC UE 3-2 contained in the PC5 header field 23 so that the Relay UE 3-1 can inform the base station who sent the message. In step s75, the Relay UE 3-1 creates a new message that contains the MTC UE encrypted message. The new message will identify the Relay UE 3-1 as the sender and will be encrypted with the Relay UE's encryption keys and then sent to the base station in step s77. Thus the inner message that is sent to the base station 5 over the Uu interface is encrypted twice—once with the encryption keys of the Relay UE 3-1 and once with the encryption keys of the MTC UE 3-2. The message is then transmitted in step s77 to the base station 5. Thus in step s79, the base station 5 determines that the message has been sent from the Relay UE 3-1 and performs a first decryption using the keys associated with the Relay UE 3-1 and determines either from the resources that were used to carry the message from the Relay UE 3-1 or from the header of the message after the first decryption, which MTC UE 3-2 is the actual sender of the message. The base station 5 then decrypts the inner message using the keys associated with the MTC UE 3-2 to recover the message sent by the MTC UE 3-2.

Similarly, if the base station 5 wishes to send a message to the MTC UE 3-2, it will first encrypt the message using the keys associated with the MTC UE 3-2. It will then add a header identifying the MTC UE 3-2 as the destination. It will then encrypt the message with the new header using the keys associated with the Relay UE 3-1 and then transmit the encrypted message to the Relay UE 3-1. Thus, when the Relay UE 3-1 decrypts the message using its own keys, it will find the header with the UE ID for the MTC UE 3-2; and so the relay UE 3-1 will know to transmit the received message to the MTC UE 3-2 over the PC5 Sidelink link 9. Similarly to the uplink transmission, instead of transmitting the message with a header having the UE ID for the MTC UE 3-2, the base station 5 may send the message to the Relay UE 3-1 using resources or a Radio Bearer that has been defined in advance for use in carrying messages that are intended for the MTC UE 3-2

Security Options 2 and 3

FIG. 7 is a timing diagram illustrating the way in which security is established in Options 2 and 3 above. As shown, for Option 2, the base station 5 generates, in step s91, encryption keys (SKeNB or similar) for use in securing the communications transmitted over the PC5 Sidelink link 9. In step s93, the base station 5 transmits these keys in a message for the Relay UE 3-1. The keys in this message will be encrypted using the encryption keys associated with the Relay UE 3-1—so they are not broadcast in an open manner. In step s95, the base station 5 transmits the same keys in a message that is sent to the MTC UE 3-2 via the Relay UE 3-1. The keys transmitted in step s95 will be encrypted first with the keys associated with the MTC UE 3-2 and then they will be encrypted with the keys associated with the Relay UE 3-1—and so again they are not transmitted in the open. Upon receiving the message, the Relay UE 3-1 will remove the second encryption—so that the keys encrypted only with the MTC UE keys are sent to the MTC UE are sent on to the MTC UE 3-2. In step s97, the Relay UE 3-1 and the MTC UE 3-2 use the received encryption keys to perform ciphering and integrity protection for all communications subsequently transmitted over the PC5 Sidelink link 9. Finally, as per Option 1 above, in step s99, LTE ciphering and integrity protection is also performed between the MTC UE 3-2 and the base station 5 for communications transmitted between them. Alternatively, encryption keys can be shared via an internet server. For example, if the MTC UE 3-2 is a smart watch that is to be authenticated by the user's mobile telephone that acts as the Relay UE 3-1, then both devices can register on an internet server and download secure keys for mutual authentication. These keys would be used to secure the PC5 Sidelink link 9 and the LTE security will be used to secure communications transmitted between the Relay UE 3-1 and the base station 5.

Option 3 is simpler—as the Relay UE 3-1 and the MTC UE 3-2 will decide between them, in step s101, what the encryption keys should be to secure the PC5 Sidelink link 9. In this option, the MTC UE 3-2 does not encrypt the messages using any LTE security. Instead, the MTC UE 3-2 relies on the Relay UE 3-1 and the base station 5 using, in step s103, the LTE security parameters associated with the Relay UE 3-1 to secure the transmissions sent over the Uu interface.

Resources for PC5 Communication

As mentioned above, the communication resources (time and frequency resources) that are used for the PC5 Sidelink link 9 may be allocated as required by the base station 5 or they may be allocated by the Relay UE 3-1 from a pool of resources that has been set aside by the base station 5 for use by the Relay UE 3-1 for the Sidelink link 9. As is normal, the resources that are used for the Sidelink link 9 may need to be changed as the amount of data to be transmitted over the Sidelink link 9 grows or reduces. If the base station 5 actively manages the resources that are provided for the Sidelink link 9, then the MTC UE 3-2 will need to transmit Status Reports and buffer Status Reports to the Relay UE 3-1 for onward transmission to the base station 5—so that the base station 5 can vary the resources that are available for the Sidelink link 9. Similarly, the Relay UE 3-1 will also have to provide Status Reports and Buffer Status Reports to the base station 5 for its own (non-relayed traffic) and for the Sidelink traffic—so that the base station 5 can vary the allocated resources for the Sidelink link 9 and the resources needed by the Relay UE 3-1 for its own communications over the Uu link.

If the Relay UE 3-1 uses resources from a pool of resources that have been allocated for the Sidelink link 9, then the Relay UE 3-1 will manage the resources needed for the Sidelink link 9 at any given time. Therefore, the MTC UE 3-2 will still need to send the Relay UE 3-1 Status reports and Buffer Status Reports so that the Relay UE 3-1 can manage the selection of the resources used for the Sidelink link from the pool of available resources. The only time that the Relay UE 3-1 will need to send a Status Report or Buffer Status Report to the base station 5 about the Sidelink link 9 is if the communication requirements for the Sidelink link 9 expand beyond the available pool of resources.

Coverage Enhancement in Relay UE

The current LTE standards allow for the repeating of messages sent between the base station 5 and MTC UEs 3-2 that are in poor coverage areas (level 1 or level 2). The repetition of the transmitted messages allows for an improvement in the decoding gain and hence improved ability to recover the transmitted message when in a poor coverage level. Where the MTC UE is transmitting via a Relay UE 3-1, the same coverage enhancements can be provided for the Sidelink link 9. Thus, the Relay UE 3-1 may provide for the repetition of transmitted messages using the pool of available resources to provide the above decoding gain.

The provision of such coverage enhancements are most important for narrow bandwidth MTC UEs that are designed to operate for a long time on an original battery. Such UEs may have an operating band of just 1.4 MHz as opposed to standard UEs that may have a bandwidth of 20 MHz for each component carrier it can use. The bandwidth of the MTC UE would be established as part of the setting up procedure that is performed when the PC5 Sidelink link 9 is established and the Relay UE 3-1 will have to ensure that the resources allocated for the Sidelink link are allocated from the pool of resources within the operating bandwidth of the MTC UE 3-2.

MTC UE

FIG. 8 is a functional block diagram illustrating some of the functionality of the MTC UE 3-2 described above. As shown, the MTC UE 3-2 has a transceiver circuit 31 that is operable to transmit signals to and to receive signals from a base station 5 and/or other UE 3 via one or more antennas 33. The MTC UE 3-2 has a controller 37 to control the operation of the MTC UE 3-2. As shown, the controller 37 is associated with a memory 39 and is coupled to the transceiver circuit 31. Although not necessarily shown in FIG. 8, the MTC UE 3-2 may have all the usual functionality of a conventional UE (such as a user interface 35) and this may be provided by any one or any combination of hardware, software and firmware, as appropriate. Software may be pre-installed in the memory 39 and/or may be downloaded via the communication network or from a removable data storage device (RMD), for example.

The controller 37 is configured to control the overall operation of the MTC UE 3-2 by, in this example, program instructions or software instructions stored within the memory 39. As shown, these software instructions include, among other things, an operating system 41, a communication control module 43, an application module 45, and a PC5 communication module 48.

The communication control module 43 handles (e.g. generates, sends and receives) control signals for controlling the connections between the mobile communication device 3 and the base station 5, or the core network entities. The communication control module 43 also controls the separate flows of uplink/downlink data and signalling that are to be transmitted to/from the base station 5, and the core network entities.

The application module 45 communicates with a remote application server using application layer signalling. The application module 45 effectively defines the reason for the communications made by the MTC UE 3-2. For example, the MTC UE 3-2 may be designed to take intermittent readings from a temperature sensor and to send those readings to a remote monitoring station. In this case, the application module 45 would be responsible for obtaining the readings from the associated sensor (not shown) and to send them to the remote monitoring station. The application module 45 may also respond to requests received from the remote monitoring station—for example to change the period between reported readings.

The PC5 communication module 48 is for controlling the establishment and setting up of the PC5 Sidelink link 9 with the Relay UE 3-1. It is also responsible for performing the ProSe discovery process discussed above and for performing communication (transmission and reception of messages) over the PC5 Sidelink link 9. The PC5 communication module 48 is also responsible for controlling the repetition of messages to be sent over the PC5 Sidelink link 9 and for controlling the combination of received messages that have been repeated by the Relay UE 3-1 when coverage enhancement needs to be performed.

Relay UE

FIG. 9 is a functional block diagram illustrating some of the functionality of the Relay UE 3-1 used in this example embodiment. As shown, the Relay UE 3-1 has a transceiver circuit 51 that is operable to transmit signals to and to receive signals from the base station 5 and/or other ProSe enabled UEs via one or more antennas 33. The Relay UE 3-1 also has a controller 57 to control the operation of the Relay UE 3-1. The controller 57 is associated with a memory 59 and is coupled to the transceiver circuit 51. Although not necessarily shown in FIG. 9, the Relay UE 3-1 has all the usual functionality of a conventional mobile communication device 3 (such as a user interface 55) and this may be provided by any one or any combination of hardware, software and firmware, as appropriate. Software may be pre-installed in the memory 59 and/or may be downloaded via the communication network or from a removable data storage device (RMD), for example.

The controller 57 is configured to control overall operation of the Relay UE 3-1 by, in this example, program instructions or software instructions stored within the memory 59. As shown, these software instructions include, among other things, an operating system 61, a communication control module 63, a PC5 communication module 68, a mapping module 69 and a resource management module 71 that manages resources used over the Sidelink link 9.

The communication control module 63 handles (e.g. generates, sends and receives) control signals for controlling the connections between the Relay UE 3-1 and the base station 5, or the core network entities. The communication control module 43 also controls the separate flows of uplink/downlink data and signalling that are to be transmitted from/to the base station 5, and the core network entities using the communications resources scheduled by the base station 5 for this purpose.

The PC5 communication module 68 is for controlling the establishment and setting up of the PC5 Sidelink link 9 with the MTC UE 3-2. It is also responsible for performing the ProSe discovery process discussed above and for performing communication (transmission and reception of messages) over the PC5 Sidelink link 9. The PC5 communication module 68 is also responsible for controlling the repetition of messages to be sent over the PC5 Sidelink link 9 and for controlling the combination of received messages that have been repeated by the MTC UE 3-2 when coverage enhancement needs to be performed.

The mapping module 69 is responsible for mapping UE identifiers used over the PC5 Sidelink link 9 to corresponding identifiers used over the Uu link with the base station 5.

The resource management module 71 is responsible for managing the resources that are used from the pool of available resources for the PC5 Sidelink link 9. The resource management module 71 receives Status Reports from the MTC UE 3-2 and controls the time and frequency resources that are used accordingly. The resource management module 71 also reports status information back to the base station 5 when the available pool of resources is insufficient for communicating the buffered data over the PC5 Sidelink link 9.

Base Station

FIG. 10 is a functional block diagram illustrating some of the functionality of the base station 5 forming part of the system 1 shown in FIG. 1. As shown, the base station 5 has a transceiver circuit 81 that is operable to transmit signals to and to receive signals from remote UEs 3 via one or more antennas 83 and that is operable to transmit signals to and to receive signals from the core network 7 via a network interface 85. The base station 5 has a controller 87 to control the operation of the base station 5. The controller 87 is associated with a memory 89 and is coupled to the transceiver circuit 81. Software may be pre-installed in the memory 89 and/or may be downloaded via the communication network or from a removable data storage device (RMD), for example.

The controller 87 is configured to control the overall operation of the base station 5 by, in this example, program instructions or software instructions stored within the memory 89. As shown, these software instructions include, among other things, an operating system 91, a communication control module 93, a Relayed MTC UE context control module 97, a Relay UE configuration module 99 and a scheduler 101.

The communication control module 93 controls the communications transmitted to and from the remote UEs and the transmission of signals to the core network 7.

The Relayed MTC UE context control module 97 maintains the context information for the MTC UE 3-2 that is being relayed via the Relay UE 3-1. This module is responsible for establishing EPS bearers through the core network 7 to the appropriate remote server that the MTC UE is intended to communicate with. It is also responsible for maintaining information that identifies the MTC UE 3-2 and that identifies the Relay UE 3-1 through which it is connecting with the base station—so that messages to be sent to the MTC UE 3-2 are sent to the Relay UE 3-1 with the correct identifier to ensure that the message is forwarded on by the Relay UE 3-1 to the correct MTC UE 3-2.

The Relay UE configuration module 99 assists the configuration of the Relay UE 3-1 as a ProSe relay UE. This module 99 will assign a pool of communication resources that the Relay UE 3-1 can use for the PC5 Sidelink link 9 and if required will assign a pool of C-RNTI numbers to use for MTC UEs 3-2 that will be relayed by the Relay UE 3-1.

The Scheduler 101 is responsible for scheduling the Relay UE 3-1 with communication resources that allow the Relay UE 3-1 to transmit data on the uplink to the base station 5, to receive data from the base station 5 on the downlink and to communicate with the MTC UE 3-2 over the Sidelink link 9.

MODIFICATIONS AND ALTERNATIVES

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that the Relay UE may have multiple connections with any number of other UEs at the same time. The above situation where there is one Relay UE 3-1 and one relayed UE 3-2 is given merely by way of example.

In the above examples, relayed communication paths have been described to use an LTE technology (i.e. the same communication technology that is used between the base station and the relaying mobile communication device). However, it will be appreciated that a communication path may be relayed using any communication technology, for example, WLAN, Wi-Fi, FlashLinQ, WiMAX, Bluetooth, BLE, ZigBee, etc. (irrespective of the communication technology used between the base station and the relaying UE).

In the above examples, the UEs perform a discovery procedure in order to establish the PC5 Sidelink link between each other. It will be appreciated that the UEs may realise such a discovery procedure by communicating any suitable messages to each other, e.g. by communicating system information broadcast (SIB) messages, master information block (MIB) messages, information exchange messages, messages forming part of a request/reply-based mechanism, and/or the like.

In the above examples, two UEs were allowed to establish a direct PC5 Sidelink link between each other. As those skilled in the art will appreciate, such connections may be established between three or more UEs, such that users of the UEs may be connected together in a conference call setup.

Further, it will be appreciated that when the Relay UE determines that a relayed UE is no longer connected (e.g. the MTC UE 3-2 went out of coverage or performed a handover to another Relay UE or another base station), the Relay UE may update its mapping module for the relayed UE that is no longer connected to the Relay UE.

In the above example embodiments, a number of software modules were described. As those skilled in the art will appreciate, the software modules may be provided in compiled or un-compiled form and may be supplied to the Relay UE, the MTC UE, and the base station as a signal over a computer network, or on a recording medium. Further, the functionality performed by part or all of this software may be performed using one or more dedicated hardware circuits. However, the use of software modules is preferred as it facilitates the updating of these devices.

Various other modifications will be apparent to those skilled in the art and will not be described in further detail here.

Glossary of 3GPP Terms

TABLE 1

| | |
|---|---|
| AS | Access Stratum |
| BM-SC | Broadcast Multicast Service Center |
| D2D | Device to Device |
| eNB | Evolved NodeB, E-UTRAN base station |
| EPC | Evolved Packet Core |
| EPS | Evolved Packet System |
| E-UTRA | Evolved UMTS Terrestrial Radio Access |
| E-UTRAN | Evolved UMTS Terrestrial Radio Access Network |
| GCSE AS | Group Communication System Enablers Application Server |
| HSS | Home Subscriber Server |
| LTE | Long Term Evolution (of UTRAN) |
| MBMS | Multimedia Broadcast/Multicast Service |
| MBMS GW | MBMS Gateway |
| MCE | Multi-cell/multicast Coordination Entity |
| MME | Mobility Management Entity |
| NAS | Non-Access-Stratum |
| PCRF | Policy and Charging Rules Function |
| PDCP | Packet Data Convergence Protocol |
| P-GW | PDN Gateway |
| ProSe | Proximity-based Services |
| (E-)RAB | (EPS-) Radio Access Bearer |
| RRC | Radio Resource Control |
| S-GW | Serving Gateway |
| TFT | Traffic Flow Template |
| Group ID | Group Identity |
| UE | User Equipment |
| UE-R | UE Relay |
| UMTS | Universal Mobile Telecommunications System |

While the invention has been particularly shown and described with reference to example embodiments thereof, the invention is not limited to these embodiments. It will understood by those of ordinary skill in the art that various changes in form and details may be made therein without departing from the spirit and scope of the present invention as defined by the claims.

The invention claimed is:

1. A method for a base comprising:
   operating with a relay user equipment configured to provide relay services to another user equipment;
      configuring the relay user equipment for relay communication with the other user equipment over a side-link;
      scheduling communication resources for use in providing the relay user equipment downlink data from the base station to the relay user equipment and uplink data from the relay user equipment to the base station;
   scheduling communication resources to be used by the relay user equipment for communicating with the other user equipment over the side-link;
      receiving a message from the relay user equipment, the message including a communication control message generated by the other user equipment; and
      maintaining communication context information for the other user equipment that communicates with the base station via the relay user equipment, the communication context information allowing the base station to be able to route data from the other user equipment through a core network and for allowing data received over the core network for the other user equipment to be transmitted to the other user equipment via the relay user equipment over the side-link.

2. The method according to claim 1, wherein the communication context information includes identification information for the other user equipment.

3. The method according to claim 2, wherein the identification information is used by the relay user equipment to address the other user equipment over the side-link.

4. The method according to claim 2, wherein the identification information includes a temporary mobile subscriber identity identifying the other user equipment to the base station and to at least one node in the core network.

5. The method according to claim 1, wherein the controller is arranged to determine that the message includes a message from the other user equipment either from the communication resources that were used to carry the message or from information included in the message.

6. The method according to claim 1, wherein the controller is arranged to perform a first decryption of the message using keys associated with the relay user equipment to generate a decrypted message and to perform a second decryption on contents of the decrypted message using keys associated with the other user equipment.

7. A method for a relay user equipment, comprising:
   providing relay communication services for another user equipment;
      receiving an allocation of communication resources from a base station to allow for downlink communication from the base station and uplink communication to the base station, and to allow for communication with the other user equipment over a side-link;

receiving a first message from the other user equipment over the side-link, the first message including a communication control message generated by the other user equipment;

generating a second message including the communication control message for transmission to the base station using the communication resources that have been allocated to the relay user equipment for the uplink communication;

wherein the second message includes communication context information for the other user equipment, the communication context information allowing the base station to be able to route data from the other user equipment through a core network and for allowing data received over the base station for the other user equipment to be transmitted to the other user equipment via the relay user equipment over the side-link;

receiving, from the base station, downlink data that includes a third message for the other user equipment; and transmitting the third message for the other user equipment to the other user equipment over the side-link.

8. The method according to claim 7, wherein the communication context information includes identification information for the other user equipment.

9. The method according to claim 8, wherein the identification information is used by the relay user equipment to address the other user equipment over the side-link.

10. The method according to claim 8, wherein the identification information includes a temporary mobile subscriber identity identifying the other user equipment to the base station and to at least one node in the core network.

11. The method according to claim 7, wherein the controller is arranged either to use communication resources that the base station associates with the other user equipment to transmit the second message or to include information identifying the other user equipment to the base station in the second message.

12. A method for a user equipment, comprising:
communicating with a relay user equipment over a side-link using communication resources;

generating a first message including a communication control message for a remote base station and data identifying that the first message includes the communication control message;

transmitting the generated first message over the side-link to the relay user equipment, wherein the first message causes the relay user equipment to send, to the remote base station, communication context information for the user equipment, the communication context information allowing the remote base station to be able to route data from the user equipment through a core network and for allowing data received over the core network for the user equipment to be transmitted to the user equipment via the relay user equipment over the side-link; and receiving a third message from the relay user equipment over the side-link, wherein the third message is included in downlink data transmitted from the remote base station.

13. The method according to claim 12, further comprising, prior to transmitting the first message to the relay user equipment, encrypting the communication control message using encryption keys specific to the remote base station and the user equipment.

14. The method according to claim 13, further comprising providing one or both of: information to the relay user equipment identifying the user equipment to the relay user equipment and information identifying the communication control message that is to be transmitted to the base station by the relay user equipment.

15. The method according to claim 12, wherein the communication control message includes a Radio Resource Control (RRC) message.

16. The method according to claim 15, wherein the RRC control message includes an RRC Connection Request message.

17. The method according to claim 12, wherein the first message further includes an identifier identifying the user equipment.

18. The method according to claim 17, wherein the identifier is Cell-Radio Network Temporary Identifier (C-RNTI).

* * * * *